Nov. 30, 1948.
E. H. EPPRECHT
2,455,243
APPARATUS FOR AUTOMATIC CONTROL
OF HEAT INPUT TO STILLPOTS
Filed July 2, 1945
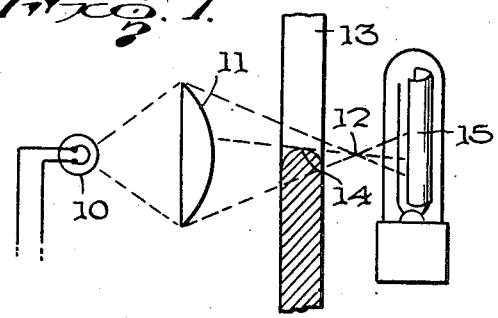
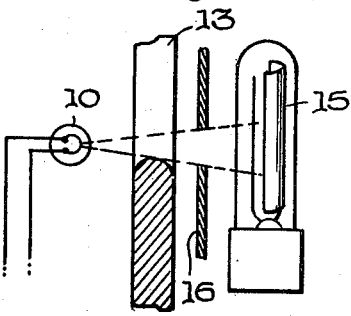
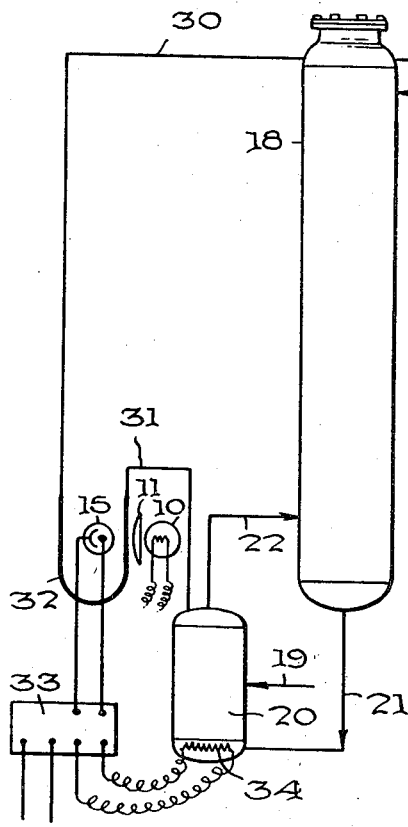
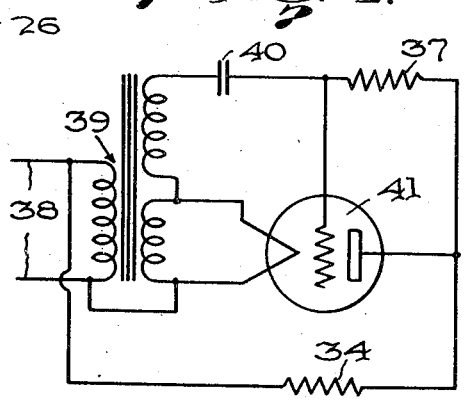
Inventor
EDWARD H. EPPRECHT
By G. M. Houghton
his Attorney Patented Nov. 30, 1948

2,455,243

UNITED STATES PATENT OFFICE 2,455,243

APPARATUS FOR AUTOMATIC CONTROL OF HEAT INPUT TO STILLPOTS

Edward H. Epprecht, Cheswick, Pa., assignor to Gulf Research & Development Company, Pittsburgh, Pa., a corporation of Delaware Application July 2, 1945, Serial No. 602,895

5 Claims. (Cl. 202—160)

This invention relates to an apparatus for automatic control and more particularly to an apparatus for the gradual automatic control of the heat input to a stillpot of a batch or continuous still.

Heretofore various control devices have been suggested wherein the liquid level in a tube such as a manometer caused the switching on and off of a motor or other similar device. The means by which this is effected may be actual electrical contact with the liquid in the tube, and particularly with mercury, or by means of a photoelectric cell and a light source so arranged that the opaque liquid in the tube could cut off the light source. These control means, however, have the disadvantage that they do not effect a gradual control but rather an on and off control. Furthermore the heat input to a stillpot in particular has not been controlled by a gradual control device.

It is an object of this invention to provide apparatus for the gradual control of the heat input in a still.

It is a further object of this invention to provide apparatus whereby a continuous still may be controlled automatically.

These and other objects are obtained by the use of a manometer or similar tube containing an opaque liquid, a light source, light focusing means, and a photoelectric cell so arranged that the light passes through the tube to strike the photoelectric cell in degrees varying with the height of the opaque liquid in the tube. Variation in the photoelectric cell current is used to cause variation in the electric load at the stillpot.

The invention may be more fully understood by reference to the preferable embodiments disclosed in the attached drawings in which Figure 1 is a diagrammatic sketch of the preferable arrangement of the photocell;

Figure 2 is a diagrammatic sketch of a device alternative to Figure 1;

Figure 3 is a view, partly diagrammatic and partly perspective, of the application of the invention to a batch still; and Figure 4 is a diagrammatic sketch showing in detail the circuit of the thyratron device of Figure 2.

With reference to the preferable disclosure in Figure 1 there is shown a light source 10 such as an electric filament, a lens 11 adapted to create a focal point 12 at some point outside of the center of manometer tube 13 so that the rise and fall of the liquid level 14 of the opaque liquid in the tube will gradually control the amount of nonparallel light beams reaching photoelectric cell 15 within a predetermined range. The lens 11 may be moved toward or away from the manometer tube so that the focal point may change position. This adjustment of the focal point allows for a wider or narrower control of the liquid level of the light reaching the photocell as the operator desires.

While not shown, it is preferable for efficient operation to enclose the light source, lens, photoelectric cell, and a portion of the manometer tube in a light-tight opaque container.

In Figure 2 there is shown a diagrammatic sketch of a photocell arrangement alternative to Figure 1 wherein the divergent light beams from source 10 pass through manometer tube 13 and thence through an adjustable slit 16 in an opaque material before striking photocell 15. The slit may be considered a focusing device similar to the lens of Figure 1. While nonparallel beams are illustrated, parallel light beams could be used.

With reference to Figure 3 there is shown a packed still which is adapted to batch or continuous operation. Feed enters by conduit 19 and reflux material from the column enters stillpot 20 by means of conduit 21 where it is heated and the vapors returned to the column by conduit 22. The distillate leaves the top of the column by conduit 24 and is condensed in the receiver 25 where it may be taken off by conduit 26 or returned in part as reflux to the column by conduit 27 and pump 28.

Line 30 from the top of column 18 and line 31 from the stillpot 20 are attached to two ends respectively of a manometer U-tube 32 about which are arranged a light source 10, a lens 11, and a photoelectric cell 15 as shown in Figure 1. The photoelectric cell 15 is connected to a thyratron device 33 which in turn controls the heating element 34 of the stillpot 20.

With reference to Figure 4 there is shown in detail the thyratron device 33 of Figure 3. This is similar to the circuit disclosed in U. S. Patent 1,289,823. The photocell is indicated as 37 and the electric heating unit 34 is in series with it as indicated and with the current source 38. A transformer 39 and capacitor 40 are arranged as indicated in the drawing. A three-element, gas-filled tube 41 (thyratron) is used in a conventional manner except that a simple alternating voltage of the same frequency as applied to the anode is used on the grid, being so arranged that the phase relation between grid and anode may be shifted from 0° to 180° by varying the capacitator 40 and the variable resistance or photoelectric cell 37.

In a packed still rectifying column the pressure differential between the condensing section and the pot is determined by four factors, namely, the density of the vapors ascending the column, the type packing used, the boil-up rate as caused by the heat input to the stillpot, and the length of the column. The heat input to the stillpot is most easily controlled and it is the factor with which this invention is primarily concerned. The boil-up rate varies from a minimum of vapor ascending the column to a maximum where flooding occurs. It is in this range that the differential pressure will vary from a very small value to a large value at the flood point. This variation in pressure is thus employed to actuate a manometer and gradually control the heat input to the stillpot by means of the photoelectric cell arrangement of the invention. When the vapor velocities within the column are low and the pressure differential in the manometer consequently low, a large amount of light reaches the photoelectric cell and the heat in the stillpot is stepped up until the pressure differentials between the stillpot and the column become great enough so that the rise of the liquid in the manometer tube will cut down the light reaching the photoelectric cell and thus reduce the heat supplied to the stillpot. Should flooding occur, a greater pressure drop is registered on the manometer and the heat to the stillpot is shut off entirely. In the distilling column shown in the drawings above described, photoelectric control increases the ease of operating the column efficiently and guards against flooding.

The light sources and the photocell are so placed that the manometer fluid will gradually increase or decrease the light intensity falling on the photocell. The range within which the manometer fluid will effect gradual control is adjustable by a change of the focal point of the light as by movement of the lens in Figure 1 or by a change in the slit in Figure 2.

The conventional U-tube type manometer is filled with an opaque liquid such as mercury or dibutyl phthalate with a dye added. However, devices other than a manometer may be used, such as a Bourdon gauge, where, by the use of a vane instead of a pointer, the light may be gradually interrupted as by the manometer tube.

Thus I have described a new and useful apparatus for the gradual control of the heat input of a stillpot by means of a gradually interrupted light beam striking a photoelectric cell.

What I claim is:

1. An apparatus for the gradual automatic control of the heating current of a stillpot comprising a manometer containing an opaque liquid actuated by the differential pressure between the stillpot and the top of the still column, a light source and a photoelectric cell arranged on opposite sides of said manometer and a lens for focusing light beams from said light source at a point outside the center of said manometer, and means for utilizing variations in current flow through the photoelectric cell to vary the heating current in the stillpot.

2. An apparatus for the gradual automatic control of the heating current of a stillpot comprising a manometer containing an opaque liquid actuated by the differential pressure between the stillpot and the top of the still column, a light source and a photoelectric cell arranged on opposite sides of said manometer and a lens for focusing light beams from said light source at a point outside the center of said manometer, and means for utilizing variations in current flow through the photoelectric cell to vary the heating current in the stillpot, said lens being movable toward or away from said manometer so as to adjust the area of said manometer exposed to the light rays, causing variation in the current flow through the said photoelectric cell.

3. An apparatus for the gradual automatic control of the heating current of a stillpot comprising a manometer containing an opaque liquid actuated by the differential pressure between the stillpot and the top of the still column, a light source and a photoelectric cell arranged on opposite sides of said manometer, means for projecting the light from said light source through a substantial longitudinal portion of the manometer and thence onto said photoelectric cell, said opaque liquid being positioned so as to gradually limit the amount of light passing through the manometer in accordance with the differential pressure between the stillpot and the top of the column, and means for gradually varying the heating current in the stillpot in accordance with variations in current from said photoelectric cell.

4. An apparatus for the gradual automatic control of the heating current of a stillpot comprising a manometer containing an opaque liquid actuated by the differential pressure between the stillpot and the top of the still column, a light source and a photoelectric cell arranged on opposite sides of said manometer, means for projecting the light from said light source through a substantial longitudinal portion of the manometer and thence onto said photoelectric cell, said opaque liquid being positioned so as to gradually limit the amount of light passing through the manometer in accordance with the differential pressure between the stillpot and the top of the column, and a thyratron tube circuit adapted to transmit gradual variations in current in the photoelectric cell to gradual variations in the heating current of the stillpot.

5. An apparatus for the gradual automatic control of the heating current of a stillpot comprising a manometer containing an opaque liquid actuated by the differential pressure between the stillpot and the top of the still column, a light source and a photoelectric cell arranged on opposite sides of said manometer, an adjustable slit in an opaque material arranged between said manometer and said cell, said slit being positioned so as to limit the light passing from said light source to the cell to the light which passes through the manometer and said slit being of sufficient dimension longitudinally of the manometer that said light reaching the cell passes through a substantial longitudinal portion of the manometer when the opaque liquid is not in that portion of the manometer, and means for varying the heating current in the stillpot in accordance with variations in current from said photoelectric cell.

EDWARD H. EPPRECHT.

REFERENCES CITED

The following references are of record in the file of this patent:

UNITED STATES PATENTS

| Number | Name | Date |
|---|---|---|
| 1,601,320 | Peters | Sept. 28, 1926 |
| 2,088,385 | Podbielniak | July 27, 1937 |
| 2,118,029 | Boyd | Mar. 24, 1938 |
| 2,149,735 | Henderson | Mar. 7, 1939 |
| 2,205,254 | Gulliksen | June 18, 1940 |
| 2,232,840 | Claffey | Feb. 25, 1941 |
| 2,386,778 | Claffey | Oct. 16, 1945 |

OTHER REFERENCES

Publication in "Electron Tubes in Industry," by Keith Henney, published by McGraw Hill Book Co., New York, 1937 pp. 400, 401. Copy in Scientific Library of office.)

Publication in "General Electric Review," entitled "Hot-cathode thyratrons," by A. W. Hull, June 1930, pp. 17-19. (Copy in Div. 54.)